July 26, 1932. W. STOECKICHT 1,868,676
FRICTION ROLLER GEARING
Filed April 23, 1930
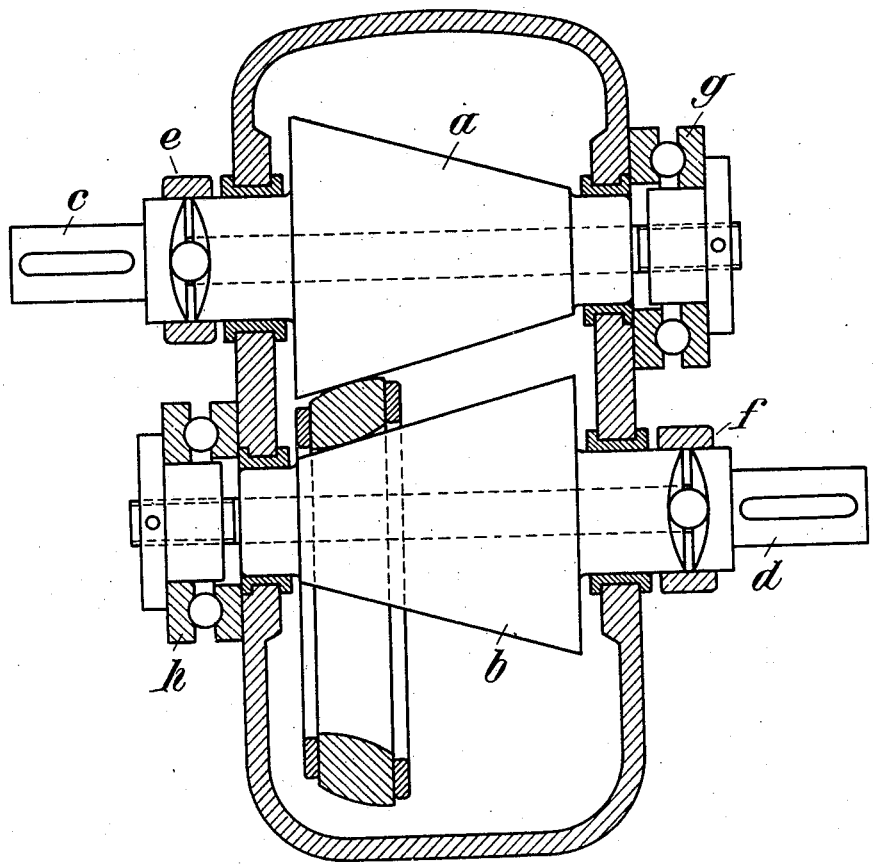
Inventor:
Wilhelm Stoeckicht Patented July 26, 1932

1,868,676

UNITED STATES PATENT OFFICE

WILHELM STOECKICHT, OF MUNICH, GERMANY

FRICTION ROLLER GEARING

Application filed April 23, 1930, Serial No. 446,682, and in Germany May 3, 1929.

My invention relates to friction roller gearings.

It is already known to combine friction roller gearings with a thrust device which during transmission of the torque produces a force acting in axial direction by which force the friction rollers are urged to one another with the power required to ensure the transmission.

My invention has for its object to improve and further develop friction roller gearings of this class. The novel feature involved by the invention consists in the fact that such a thrust device is provided both on the driving and on the driven shaft. This arrangement on the one hand results in a greater safety of the power transmission, more particularly with yerkwise drive, with all friction roller gearings, it being immaterial whether having a fixed or variable gear ratio. On the other hand, when applied to friction roller gearings for variable gear ratio my invention affords a further important advantage in so far as it permits of the proportion existing between the circumferential force and the axial force of engagement being rendered more uniform on the entire range of regulation.

In order that my invention can be more readily understood, an embodiment of the same is illustrated by way of example in the accompanying drawing which illustrates in a sectional view a variable friction roller gearing having two friction cones and an intermediate ring. My new arrangement is of course not confined to this special type of gearing but can be applied to any other friction roller gearing.

In the embodiment illustrated a ring $i$ revolves in known manner between two friction cones $a$ and $b$. The cones $a$ and $b$ are connected, respectively, to the driving and driven shaft $c$ and $d$ by an automatic thrust device $e$ and $f$, respectively. The bearings $g$ and $h$ serve to take up the reaction forces produced by the thrust devices.

The automatic thrust devices illustrated are formed by pairs of discs having curved end faces, and antifriction members therebetween, but any other suitable design of thrusting means can be made use of.

An important advantage of my new arrangement resides in the fact that all shocks of load that may occur during operation, immaterially whether coming from the driving or driven side, are absorbed. Every shock thus passes through the thrust device first before arriving at the places of engagement. This feature is of great importance as to a secure and reliable power transmission.

The further advantage afforded by the new arrangement when applied to variable friction roller gearings resides in the following: It may be assumed that only one of the friction cones, for instance cone $a$, is fitted with a thrust device. Then this device produces an axially acting force that in turn produces the engaging pressure and is in a determined proportion to the torque to be transmitted. The selection of this proportion depends upon the smallest diameter of the shell surface of cone $a$, since at this place the circumferential force has its highest value. With the greater diameters of the shell surface the proportion of the axial force to the circumferential force is greater than required. The efficiency of the gearing thus becomes the more satisfactory the greater is the operative diameter of cone $a$.

This disadvantageous condition is notably improved by the provision of a thrust device on each of the two friction cones. In this case the proportion existing between the torque to be transmitted and the axial force produced is not longer determined for each thrust device by the smallest diameter but by the average one of the shell surface of the cone. This results primarily in a lower proportion between the axial force and the circumferential force in each of the thrust devices and therewith in a lower stress of the entire gearing, and furthermore, the drop of efficiency toward the extremities of the cones becomes smaller than with gearings that have one thrust device only.

My invention thus affords an increased safety and reliability of operation, a more uniform course of the curve of efficiency and a better utilization of friction roller gearings, when designed according to the invention.

I claim:—

A friction roller gearing comprising a driving shaft, a driven shaft, means on the shafts for providing a drive connection therebetween, and an automatic thrust device mounted on each shaft to automatically provide the uniform axial force required to secure power transmission in the drive connection at any speed and direction of rotation.

In testimony whereof I have affixed my signature.

WILHELM STOECKICHT.